United States Patent [19]

Axmann

[11] Patent Number: 5,670,271
[45] Date of Patent: Sep. 23, 1997

[54] MANGANESE (III)-DOPED NICKEL (II) HYDROXIDE POWDERS

[75] Inventor: Peter Axmann, Göttingen, Germany

[73] Assignee: H. C. Starck GmbH & Co., KG, Goslar, Germany

[21] Appl. No.: 551,451

[22] Filed: Nov. 1, 1995

[30] Foreign Application Priority Data

Nov. 9, 1994 [DE] Germany ............... 44 39 989.8

[51] Int. Cl.$^6$ ............................................ H01M 4/32
[52] U.S. Cl. .................. 429/59; 429/223; 429/224; 423/140
[58] Field of Search ............................ 429/223, 224, 429/59; 423/142, 144, 140; 205/50, 67

[56] References Cited

U.S. PATENT DOCUMENTS

5,508,121  4/1996  Sawa ............................................ 429/59

FOREIGN PATENT DOCUMENTS

| | | | |
|---|---|---|---|
| A0523284A2 | 11/1991 | European Pat. Off. ......... | H01M 4/52 |
| A0633223 | 1/1995 | European Pat. Off. ......... | C01G 53/00 |
| 4323007A1 | 7/1993 | Germany ......................... | H01M 4/52 |
| A9419939 | 9/1994 | WIPO ............................... | H01M 4/00 |

OTHER PUBLICATIONS

Chemical Abstracts, vol. 123, No. 10, Sep. 4, 1995, Columbus, OH; abstract no. 118406 XP002009554.

Chemical Abstracts, vol. 105, no. 22 1 Dec. 1986.

Chemical Abstracts, vol. 108, no. 4 25 Jan. 1988.

Power Sources, 1996, pp.239–255, by J.P. Harivel, B. Morignat, J. Labat and J.F. Laurent, Fundamental Research Laboratory, Seine, France (translated).

German Patent Office Search Report dated Apr. 28, 1995.

*Primary Examiner*—John Niebling
*Assistant Examiner*—Brendan Mee
*Attorney, Agent, or Firm*—Jerry Cohen

[57] ABSTRACT

The present invention relates to manganese-containing nickel(II) hydroxide powders, wherein at least 50 mole % of the manganese are present in the trivalent oxidation state, a process for the preparation of such powders and battery electrodes and batteries made therefrom.

20 Claims, 2 Drawing Sheets

MANGANESE (III)-DOPED NICKEL (II) HYDROXIDE POWDERS

BACKGROUND OF THE INVENTION

The present invention relates to manganese-containing nickel(II) [i.e. chemical valence-II] hydroxide powders, at least 50 mole % of the manganese being present in the trivalent oxidation state, a process for their preparation and the use thereof.

Nickel(II) hydroxide is used as a positive electrode material in alkaline accumulators. Modifications to certain electrochemical properties may be achieved by incorporating various foreign ions.

The incorporation of manganese ions into nickel hydroxide is described in Power Sources 1966, Pergamon Press, pages 239 ff. Doping with manganese(II) ions leads to a product with a $\beta$-Ni(OH)$_2$ structure, and oxidation with hydrogen peroxide leads to amorphous manganese(IV) products.

No practical consequences, however, can be derived from the literature mentioned with regard to improving the properties and/or using said materials in secondary batteries.

A manganese-doped nickel hydroxide suitable for use as a positive electrode material is known from the relatively old published German patent application P 4 323 007.5. This reference discloses a trivalent manganese-containing nickel hydroxide with a pyroaurite structure. In comparison with undoped nickel hydroxide, it is characterized by an increased cycle stability and improved utilization of the nickel proportion. However, it requires a relatively long electrochemical forming process.

A principal object of the present invention is to provide a manganese(III)-doped nickel hydroxide which has outstanding electrochemical properties.

SUMMARY OF THE INVENTION

Surprisingly, it was found that partial replacement of the trivalent manganese in the nickel hydroxide matrix by other trivalent cations leads to the more rapid achievement of high capacities.

This invention therefore relates to cation material-containing nickel(II) hydroxide powders, with at least a portion of the cation content being manganese(III) at least 50 mole % of the cation material being present in the trivalent oxidation state. The powders are characterized in that they contain as 5 to 60 mole % of the cation material present in the trivalent oxidation state as one or more of the elements aluminium, gallium, indium, iron, cobalt, chromium and rare earth elements in the trivalent oxidation state, balance manganese(III).

The nickel(II) hydroxide powders made according to the invention also permit an increase in the work potential during discharge. Moreover, a particularly positive factor to be noted is the increase in the electrochemical effectiveness.

These nickel(II) hydroxide powders doped with manganese(III) and with partial replacement of the trivalent manganese as indicated above make it feasible to achieve discharge capacities which may exceed the utilization of the theoretical one-electron step for nickel.

Preferably, 10 to 50 mole % of the manganese in the nickel(II) hydroxide powders according to the invention are replaced by the elements present in the trivalent oxidation state. Particularly good results are obtained if at least 80 mole %, preferably at least 90 mole % are present in the trivalent oxidation state, in each case 5 to 60 mole % being replaced by the above-mentioned elements present in the trivalent oxidation state.

The molar ratio of Ni to trivalent cation dopant, including trivalent manganese plus the above-mentioned trivalent elements, is in the region of 100:1 to 3:1, particularly preferably 5:1 to 3:1.

If the nickel hydroxide according to the invention is to contain further doping elements, as is required in some cases of nickel hydroxide for the production of batteries, it may preferably contain one or more of the elements of the group comprising Cd, Co, Zn, Ca and Mg present in the divalent oxidation state in a maximum total quantity of 8 mole %, based on the total quantity of nickel and manganese plus manganese substituents indicated above.

Preferably, the nickel(II) hydroxide powders have particle sizes of 1 to 100 µm.

This invention also relates to a process for the preparation of the manganese(III) (and trivalent substituents)-containing nickel(II) hydroxide powders according to the invention. This is carried out by co-precipitating solutions of nickel(II), manganese(III) and the elements present in the trivalent oxidation state with alkali liquors. NaOH and/or KOH may be used as alkali liquors, spherical products being obtained in the further presence of ammonia.

In a preferred embodiment, the manganese(III) salt solution is prepared by combining manganese(II) salt solution with corresponding quantifies of permanganate, peroxodisulphate or H$_2$O$_2$ solution. The trivalent manganese may be prepared by mixing permanganate and manganese(II) solutions in the appropriate proportions. In preference, the manganese(II) salt solution and/or the permanganate solution contains nickel(II) salts.

The manganese(III) salt solution may contain stabilizing anions. Particularly suitable anions are sulphates and phosphates.

In order to prepare additionally doped nickel hydroxides, co-precipitation may be carried out in the presence of soluble salts of elements of the group comprising Co, Zn, Cd, Ca and Mg present in the divalent oxidation state.

The manganese(III)-containing nickel hydroxide powder according to the invention is outstandingly suitable as an electrode material in secondary batteries. This invention thus also relates to said use and to electrodes and batteries incorporating such powder.

The invention is explained below on the basis of an example of the exchange of Mn(III) for Al(III), but this should not be regarded as a limitation.

DETAILED DESCRIPTION OF PREFERRED EMBODIMENTS

EXAMPLES 1 to 5

Partial replacement of Mn(III) by Al(III) in the Ni$_4$Mn$_x$Al$_{1-x}$ system

Procedure

Solutions A and B were combined continuously by means of a mixing chamber, in each case with the aid of separate pumps with the same volume throughput (100 ml/h). After a total reaction time of 20 sec. the solution was dripped into a charge of KOH, the pH of which was monitored with the aid of a glass electrode and was kept constant (pH=12.50) by adding a correction liquor (KOH 3.5 molar). The product in each case was centrifuged after 15 h ageing and washed five times with 650 ml of liquor at pH 12.50 in each case, and subsequently dried for three days under a vacuum at 51° C.

The products exhibited a characteristic X-ray spectrum.

1. "$Ni_4Mn_1Al_0$" (i.e. $Ni_4Mn$)

| Solution A: | $NiSO_4.6H_2O$ | 26.28 g |
| --- | --- | --- |
| | $MnSO_4.H_2O$ | 3.380 g |
| | $Al_2(SO_4)_3.18H_2O$ | 0.000 g |
| | 12.5 g $H_2SO_4$ | |
| | 10.0 g $H_3PO_4$ | |
| | $H_2O$ ad 125 ml | |
| Solution B: | $KMnO_4$ | 0.7904 g |
| | 12.5 g $H_2SO_4$ | |
| | 10.0 g $H_3PO_4$ | |
| | $H_2O$ ad 125 ml | |

2. "$Ni_4Mn_{0.75}Al_{0.25}$"

| Solution A: | $NiSO_4.6H_2O$ | 26.28 g |
| --- | --- | --- |
| | $MnSO_4.H_2O$ | 2.535 g |
| | $Al_2(SO_4)_3.18H_2O$ | 2.083 g |
| | 12.5 g $H_2SO_4$ | |
| | 10.0 g $H_3PO_4$ | |
| | $H_2O$ ad 125 ml | |
| Solution B: | $KMnO_4$ | 0.5925 g |
| | 12.5 g $H_2SO_4$ | |
| | 10.0 g $H_3PO_4$ | |
| | $H_2O$ ad 125 ml | |

3. "$Ni_4Mn_{0.5}Al_{0.5}$"

| Solution A: | $NiSO_4.6H_2O$ | 26.28 g |
| --- | --- | --- |
| | $MnSO_4.H_2O$ | 1.690 g |
| | $Al_2(SO_4)_3.18H_2O$ | 4.163 g |
| | 12.5 g $H_2SO_4$ | |
| | 10.0 g $H_3PO_4$ | |
| | $H_2O$ ad 125 ml | |
| Solution B: | $KMnO_4$ | 0.395 g |
| | 12.5 g $H_2SO_4$ | |
| | 10.0 g $H_3PO_4$ | |
| | $H_2O$ ad 125 ml | |

4. "$Ni_4Mn_{0.25}Al_{0.75}$"

| Solution A: | $NiSo_4.6H_2O$ | 26.28 g |
| --- | --- | --- |
| | $MnSO_4.H_2O$ | 0.845 g |
| | $Al_2(SO_4)_3.18H_2O$ | 6.25 g |
| | 12.5 g $H_2SO_4$ | |
| | 10.0 g $H_3PO_4$ | |
| | $H_2O$ ad 125 ml | |
| Solution B: | $KMnO_4$ | 0.1978 g |
| | 12.5 g $H_2SO_4$ | |
| | 10.0 g $H_3PO_4$ | |
| | $H_2O$ ad 125 ml | |

5. "$Ni_4Mn_0Al_1$" (i.e. $Ni_4Al$)

| Solution A: | $NiSO_4.6H_2O$ | 26.28 g |
| --- | --- | --- |
| | $MnSO_4.H_2O$ | 0.000 g |
| | $Al_2(SO_4)_3.18H_2O$ | 8.330 g |
| | 12.5 g $H_2SO_4$ | |
| | 10.0 g $H_3PO_4$ | |
| | $H_2O$ ad 125 ml | |
| Solution B: | $KMnO_4$ | 0.00 g |
| | 12.5 g $H_2SO_4$ | |
| | 10.0 g $H_3PO_4$ | |
| | $H_2O$ ad 125 ml | |

Analytical results:

| "X" = in | Proportions by weight [%] | | | Molar ratios [%] | | |
| --- | --- | --- | --- | --- | --- | --- |
| $Ni_4Mn_{1-x}Al_x$ | Ni | Mn | Al | Ni | Mn | Al |
| 0.00 | 45.45 | 9.73 | 0 | 81.3 | 18.7 | 0 |
| 0.25 | 42.28 | 6.97 | 1.93 | 78.4 | 13.8 | 7.8 |
| 0.50 | 43.67 | 5.95 | 3.77 | 75.0 | 10.9 | 14.1 |
| 0.75 | 44.36 | 2.42 | 5.977 | 74.0 | 4.3 | 21.7 |
| 1.00 | 43.99 | 0 | 7.47 | 73.1 | 0 | 26.9 |

Electrochemical tests

Figure 1:
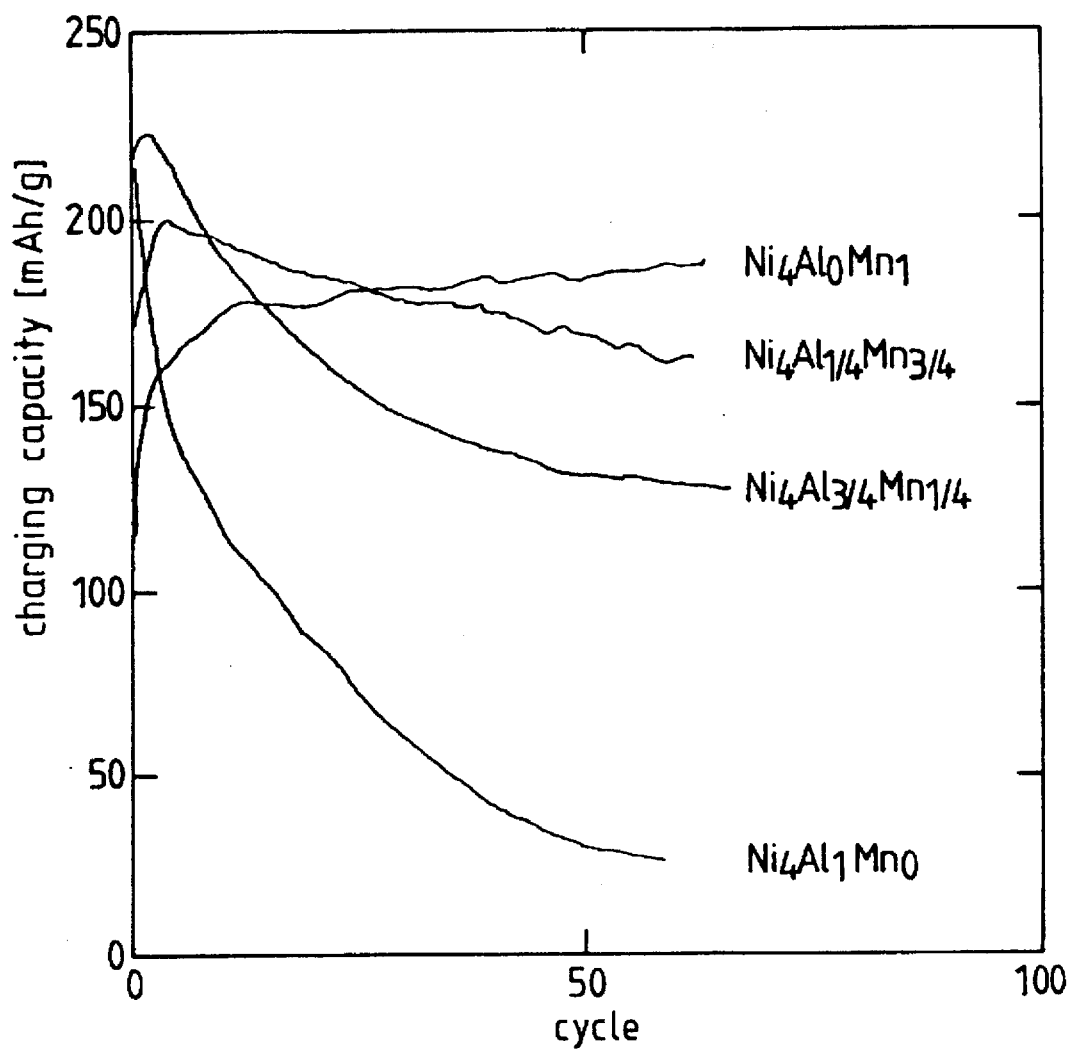
FIGS. 1 and 2 are plots of cycle behavior and discharge characteristics of batteries whose positive electrode is made of certain nickel hydroxide powders as described below.

Cycle behavior:

FIG. 1 shows the cycle behavior of the above materials.

The purely manganese-doped electrode ($Ni_4Mn_1Al_0$) starts with capacities of around 120 mAh/g and then increases within 10 cycles to 170 mAh/g. The increase thereafter takes place constantly but with a low gradient.

A 25% substitution of Mn(III) by Al(III) leads to a capacity of 170 mAh/g in the very first cycle with the corresponding electrode, which figure then increases to 200 mAh/g as a maximum value as the cycles proceed.

In the case of a 75% exchange of Mn(III) for Al(III), an initial capacity of around 220 mAh/g is obtained with a maximum value of 225 mAh/g. Said charging capacity markedly exceeds the theoretical one-electron stage for nickel.

Figure 2:
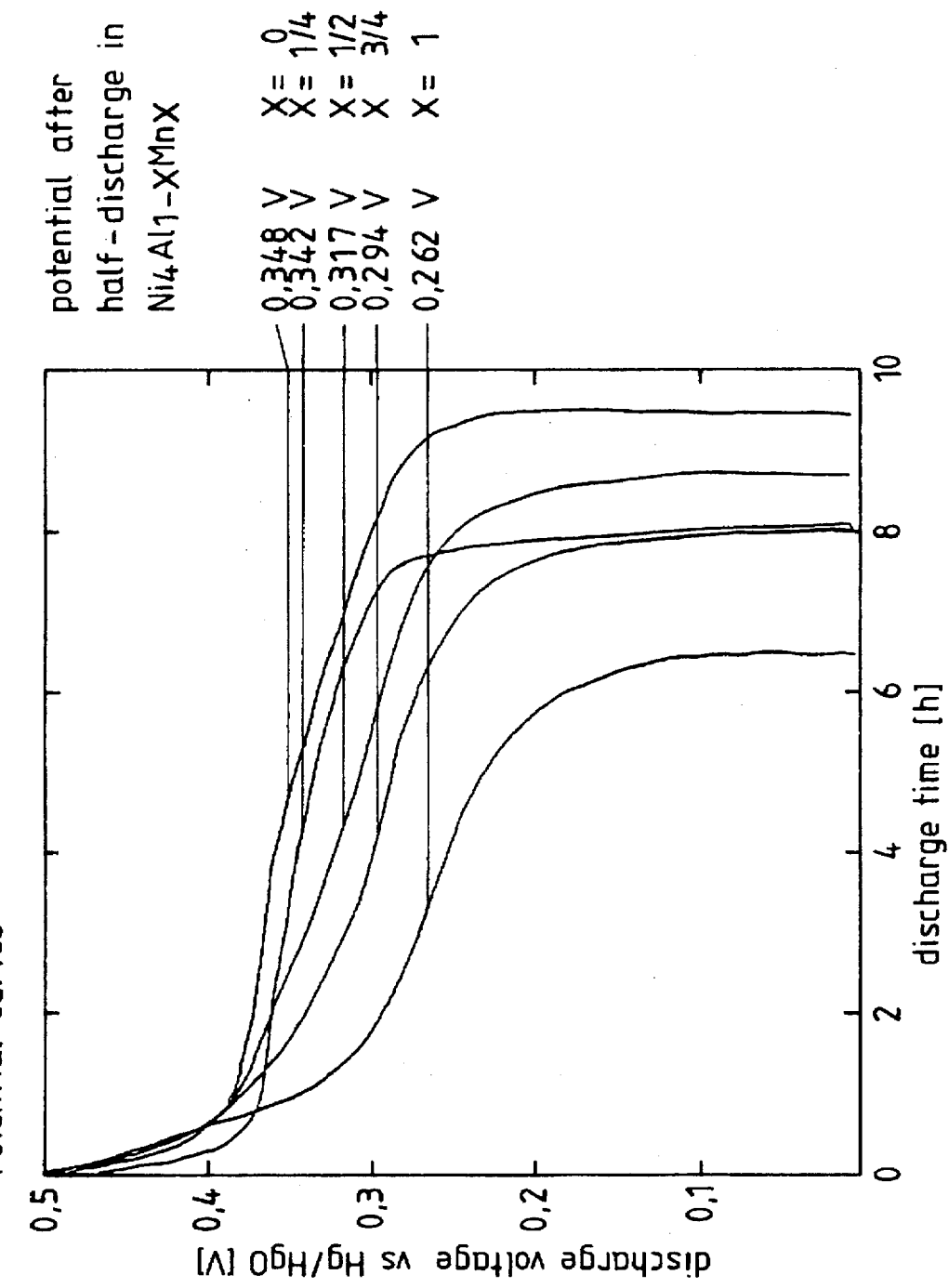

Potential curves:

The discharge characteristics for the first cycle of the electrodes listed in the examples are shown in FIG. 2.

As a result of the increasing substitution of Mn(III) by Al(III), the mean discharge potential of the Mn(III)-doped nickel hydroxide electrode can be increased.

An advantage thereof is that the useful energy content of the electrode also increases with the increased potential.

I claim:

1. Cation doped nickel(II) hydroxide powders, wherein at least 50 mole % of the cation dopants are present in the trivalent oxidation state, characterized in that 5 to 60 mole % of the dopants present in the trivalent oxidation state are trivalent elements selected from the group consisting of aluminum, gallium, indium, iron, cobalt, chromium and rare earth elements, balance manganese(III).

2. Nickel(II) hydroxide powder according to claim 1, characterized in that 90 to 50 mole % of the dopant present in the trivalent oxidation state is manganese (III).

3. Nickel(II) hydroxide powder according to either of claims 1 or 2, characterized in that at least 80 mole % of the dopant is present in the trivalent oxidation state.

4. Nickel(II) hydroxide powder according to claim 3, characterized in that at least 90 mole % of the dopant is present in the trivalent oxidation state.

5. Nickel(II) hydroxide powder according to either of claims 1 or 2, characterized in that the molar ratio of Ni to the trivalent dopant elements is from 100 to 1 to 3 to 1.

6. Nickel(II) hydroxide powder according to claim 5, characterized in that the said molar ratio is from 5 to 1 to 3 to 1.

7. Nickel(II) hydroxide powder according to claim 6 characterized in that it has one or more additional divalent dopant elements selected from the group consisting of Cd, Co, Zn, Ca and Mg in a maximum total quantity of 8 mole %, based on the total quantity of nickel and cation dopants.

8. Nickel(II) hydroxide powder according to either of claims 1 or 2 characterized in that it has an additional divalent dopant element selected from the group consisting of Cd, Co, Zn, Ca and Mg in a maximum total quantity of 8 mole %, based on the total quantity of nickel and cation dopants.

9. Nickel(II) hydroxide powder according to claim 6 characterized in that the powder has a particle size of 1 to 100 μm.

10. Nickel(II) hydroxide powder according to either of claims 1 or 2, characterized in that the powder has a particle size of 1 to 100 μm.

11. A battery comprising a first positive electrode made of a nickel (II) hydroxide powder according to either of claims 1 or 2, a counter-electrode and an electrolyte.

12. A battery comprising a first positive electrode made of a nickel (II) hydroxide powder according to claim 9, a counter electrode and an electrolyte.

13. A battery comprising a first positive electrode made of a nickel (II) hydroxide powder, containing two or more dopants present in the trivalent oxidation state, according to claim 10, a counter-electrode and an electrolyte.

14. A process for the preparation of nickel(II) hydroxide powders containing two or more dopants present in trivalent oxidation state and including at least manganese (III), characterized in that the powders are co-precipitated from solutions of nickel(II), manganese(III) and other elements present in the trivalent oxidation state with alkali liquors.

15. A process according to claim 14, characterized in that the manganese(III) solution is prepared by combining manganese(II) salt solutions with corresponding quantities of a material selected from the group consisting of permanganate, peroxodisulfate and $H_2O_2$ solution.

16. A process according to claim 14, characterized in that at least one of the manganese(II) salt solution and the permanganate solution contains nickel(II) salts.

17. A process according to claim 14, characterized in that the manganese(III) salt solution contains stabilizing anions.

18. A process according to claim 14, characterized in that co-precipitation is carried out in the presence of soluble salts of elements from the group consisting of Co, Zn, Cd, Ca and Mg, all as present in the divalent oxidation state.

19. A doped nickel (II) hydroxide powder, containing two or more dopants present in the trivalent oxidation state, as made by the process of any of claims 14–18.

20. A battery comprising a first positive electrode made of a nickel (II) hydroxide powder according to claim 19, a counter-electrode and an electrolyte.

* * * * *